US008615733B2

(12) United States Patent
Bolf et al.

(10) Patent No.: US 8,615,733 B2
(45) Date of Patent: Dec. 24, 2013

(54) BUILDING A COMPONENT TO DISPLAY DOCUMENTS RELEVANT TO THE CONTENT OF A WEBSITE

(75) Inventors: Didier Marc Jean Bolf, Boulogne-Billancourt (FR); Alexis-Jean Laurent Naibo, Levallois-Perret (FR)

(73) Assignee: SAP France S.A., Paris (FR)

( * ) Notice: Subject to any disclaimer, the term of this patent is extended or adjusted under 35 U.S.C. 154(b) by 1188 days.

(21) Appl. No.: 12/023,996

(22) Filed: Jan. 31, 2008

(65) Prior Publication Data

US 2009/0199158 A1 Aug. 6, 2009

(51) Int. Cl.
*G06F 9/44* (2006.01)
*G06F 17/30* (2006.01)

(52) U.S. Cl.
USPC ............ 717/106; 707/722; 707/726; 707/755

(58) Field of Classification Search
None
See application file for complete search history.

(56) References Cited

U.S. PATENT DOCUMENTS

| | | | |
|---|---|---|---|
| 6,598,046 B1* | 7/2003 | Goldberg et al. | 1/1 |
| 6,734,886 B1 | 5/2004 | Hagan et al. | |
| 7,136,875 B2 | 11/2006 | Anderson et al. | |
| 7,512,601 B2* | 3/2009 | Cucerzan et al. | 1/1 |
| 7,685,159 B2* | 3/2010 | Mitchell et al. | 707/726 |
| 7,860,872 B2* | 12/2010 | Serjeantson et al. | 707/755 |
| 7,933,906 B2* | 4/2011 | Hammond et al. | 707/750 |
| 7,941,428 B2* | 5/2011 | Huston | 707/722 |
| 7,953,730 B1* | 5/2011 | Bleckner et al. | 707/722 |
| 8,266,162 B2* | 9/2012 | Cava | 707/755 |
| 8,364,669 B1* | 1/2013 | Chowdhury et al. | 707/726 |
| 8,407,665 B1* | 3/2013 | Eddings et al. | 717/106 |
| 2002/0049961 A1* | 4/2002 | Fang et al. | 717/127 |
| 2002/0099685 A1 | 7/2002 | Takano et al. | |
| 2003/0046345 A1* | 3/2003 | Wada et al. | 709/205 |
| 2003/0069873 A1 | 4/2003 | Fox et al. | |
| 2003/0154413 A1 | 8/2003 | Shigeeda | |
| 2004/0093327 A1* | 5/2004 | Anderson et al. | 707/3 |
| 2005/0229167 A1* | 10/2005 | Henning et al. | 717/143 |
| 2006/0059162 A1* | 3/2006 | Rizk et al. | 707/10 |
| 2006/0161542 A1* | 7/2006 | Cucerzan et al. | 707/5 |
| 2006/0277168 A1* | 12/2006 | Hammond et al. | 707/3 |
| 2006/0294074 A1* | 12/2006 | Chang | 707/3 |
| 2008/0015927 A1* | 1/2008 | Ramirez | 705/10 |
| 2008/0059327 A1 | 3/2008 | Bloomfield | |

(Continued)

FOREIGN PATENT DOCUMENTS

WO  WO-01/44992 A1  6/2001

OTHER PUBLICATIONS

Omprakash D Gnawali, A Keyword-Set Search System for Peer-to-Peer Networks, 2002 MIT, 65 pages, <http://pdos.csail.mitedu/papers/chord:om_p-meng.pdf>.*

(Continued)

*Primary Examiner* — Thuy Dao
*Assistant Examiner* — Cuong V Luu
(74) *Attorney, Agent, or Firm* — Mintz, Levin, Cohn, Ferris, Glovsky and Popeo, P.C.

(57) ABSTRACT

A computer readable storage medium includes executable instructions to accept a selection of a website to add a document retrieval component for retrieving related reports. Specifications for the document retrieval component are collected. Specifications for how to perform a search for the related reports are received. The document retrieval component is added to the website.

13 Claims, 9 Drawing Sheets

(56) References Cited

U.S. PATENT DOCUMENTS

| | | | |
|---|---|---|---|
| 2008/0119953 A1 | 5/2008 | Reed et al. | |
| 2008/0195483 A1 | 8/2008 | Moore | |
| 2008/0300980 A1 | 12/2008 | Benjamin et al. | |
| 2009/0119169 A1* | 5/2009 | Chandratillake et al. | 705/14 |
| 2009/0172551 A1* | 7/2009 | Kane et al. | 715/733 |
| 2009/0199158 A1 | 8/2009 | Bolf et al. | |
| 2010/0083217 A1* | 4/2010 | Dalal et al. | 717/106 |
| 2010/0153515 A1* | 6/2010 | Lau et al. | 717/106 |

OTHER PUBLICATIONS

Pengxuan Liu, Automatic Characteristics Generation for Search Keywords in Paid Search Advertising, 2007 Tepper school of business, 21 pages, <http://repository.cmu.edu/cgi/viewcontent.cgi?article=1327>.*

Jop Brocker et al., Semantics & Search Engine Optimisation, 2008, 15 pages, <http://www.yes2web.nl/files/ebooks/semantic-web-seo.pdf>.*

Bill Kules et al., From Keyword Search to Exploration How Result Visualization Aids Discovery on the Web, 2008 eprints, 60 pages, <http://eprints.soton.ac.uk/265169/1/VSRWeb-TR.pdf>.*

Dr. Pranav Anand et al., ReSEARCH a Requirements Search Engine, 2008 DTIC, 55 pages, <http://www.dtic.mil/cgi-bin/GetTRDoc?AD=ADA493632>.*

Gabe Rich, An Empirical Analysis of the Auction Bids for Keyword Types in Sponsored Search, 2008 Northwestern University, 36 pages, <http://mmss.wcas.northwestern.edu/thesis/articles/get/625/rich2008.pdf>.*

* cited by examiner

FIG. 8

BUILDING A COMPONENT TO DISPLAY DOCUMENTS RELEVANT TO THE CONTENT OF A WEBSITE

CROSS REFERENCE TO RELATED APPLICATIONS

This application is related to the following concurrently filed, commonly owned U.S. patent application, which is incorporated herein by reference in its entirety: "Apparatus and Method for Displaying Documents Relevant to the Content of a Website," filed Jan. 31, 2008, Ser. No. 12/024,024, the contents of which are hereby fully incorporated by reference.

BRIEF DESCRIPTION OF THE INVENTION

This invention relates generally to searching. More particularly, this invention relates to building a component for retrieving documents that are relevant to the content of a website.

BACKGROUND OF THE INVENTION

Business Intelligence (BI) generally refers to a category of software systems and applications used to improve business enterprise decision-making and governance. These software tools provide techniques for analyzing and leveraging enterprise applications and data. These tools are commonly applied to financial, human resource, marketing, sales, service provision, customer and supplier analyses. More specifically, these tools can include: reporting and analysis tools to analyze, forecast and present information, content delivery infrastructure systems for delivery, storage and management of reports and analytics, data warehousing systems for cleansing and consolidating information from disparate sources, and integration tools to analyze and generate workflows based on enterprise systems. Business Intelligence tools work with data management systems, such as relational databases or On Line Analytic Processing (OLAP) systems used to collect, store, and manage raw data and transactional enterprise systems that generate data.

There are a number of commercially available products to produce reports from stored data. For instance, Business Objects, an SAP company, San Jose, Calif. sells a number of widely used report generation products, including Crystal Reports™, Business Objects Voyager™, Business Objects Web Intelligence™, and Business Objects Enterprise™. As used herein, the term report refers to information automatically retrieved (i.e., in response to computer executable instructions) from a data source (e.g., a database, a data warehouse, a plurality of reports, and the like), where the information is structured in accordance with a report schema that specifies the form in which the information should be presented. A non-report is an electronic document that is constructed without the automatic retrieval of information from a data source. Examples of non-report electronic documents include typical business application documents, such as a word processor document, a presentation document, and the like.

A report document specifies how to access data and format it. A report document where the content does not include external data, either saved within the report or accessed live, is a template document for a report rather than a report document. Unlike other non-report documents that may optionally import external data within a document, a report document by design is primarily a medium for accessing, formatting, transforming and or presenting external data.

A report is specifically designed to facilitate working with external data sources. In addition to information regarding external data source connection drivers, the report may specify advanced filtering of data, information for combining data from different external data sources, information for updating join structures and relationships in report data, and instructions including logic to support a more complex internal data model (that may include additional constraints, relationships, and metadata).

In contrast to a spreadsheet type application, a report generation tool is generally not limited to a table structure but can support a range of structures, such as sections, cross-tables, synchronized tables, sub-reports, hybrid charts, and the like. A report design tool is designed primarily to support imported external data, whereas a spreadsheet application equally facilitates manually entered data and imported data. In both cases, a spreadsheet application applies a spatial logic that is based on the table cell layout within the spreadsheet in order to interpret data and perform calculations on the data. In contrast, a report design tool is not limited to logic that is based on the display of the data, but rather can interpret the data and perform calculations based on the original (or a redefined) data structure and meaning of the imported data. The report may also interpret the data and perform calculations based on pre-existing relationships between elements of imported data. Spreadsheet applications generally work within a looping calculation model, whereas report generation tools may support a range of calculation models. Although there may be an overlap in the function of a spreadsheet document and a report document, the applications used to generate these documents contain instructions that express different assumptions concerning the existence of an external data source and different logical approaches to interpreting and manipulating imported data.

When viewing a website, it is helpful for users to be able to find documents with related information to supplement the data provided by the website. However, many users have hundreds or even thousands of documents available to them and it can be a difficult task to find the most relevant documents.

In view of the foregoing, it would be beneficial to provide a component that automatically retrieves documents relevant to the content of the website. Furthermore, it would be helpful if the component can be customized for and added to any website.

SUMMARY OF INVENTION

The invention includes a computer readable storage medium with executable instructions to accept a selection of a website to add a document retrieval component for retrieving related reports. Specifications for the document retrieval component are collected. Specifications for how to perform a search for the related reports are received. The document retrieval component is added to the website.

BRIEF DESCRIPTION OF THE FIGURES

The invention is more fully appreciated in connection with the following detailed description taken in conjunction with the accompanying drawings, in which:

FIG. 8 illustrates a website and a custom widget displaying related documents in accordance with an embodiment of the invention.

Like reference numerals refer to corresponding parts throughout the several views of the drawings.

DETAILED DESCRIPTION OF THE INVENTION

The following terminology is used while disclosing embodiments of the invention:

Facets are groupings of concepts of the same inherent type. A faceted classification system allows the assignment of multiple classifications to an object, enabling the classifications to be ordered in multiple ways. Facets for searching tend to be based on how data is indexed. Some examples of facets are document format, organization department (i.e., finance, sales, marketing, etc.) and region.

Look-and-feel signifies the experience a person has using a product. It defines the main features of the product's appearance and interfaces.

Single sign-on is a method of access control. It enables a user to authenticate once and gain access to the resources of multiple software systems. In most cases, the initial authentication happens when the user logs on to their operating system.

A widget is a portable segment of code that can be installed and executed within any separate HyperText Markup Language (HTML) based web page by an end user without requiring additional compilation.

Figure 1:
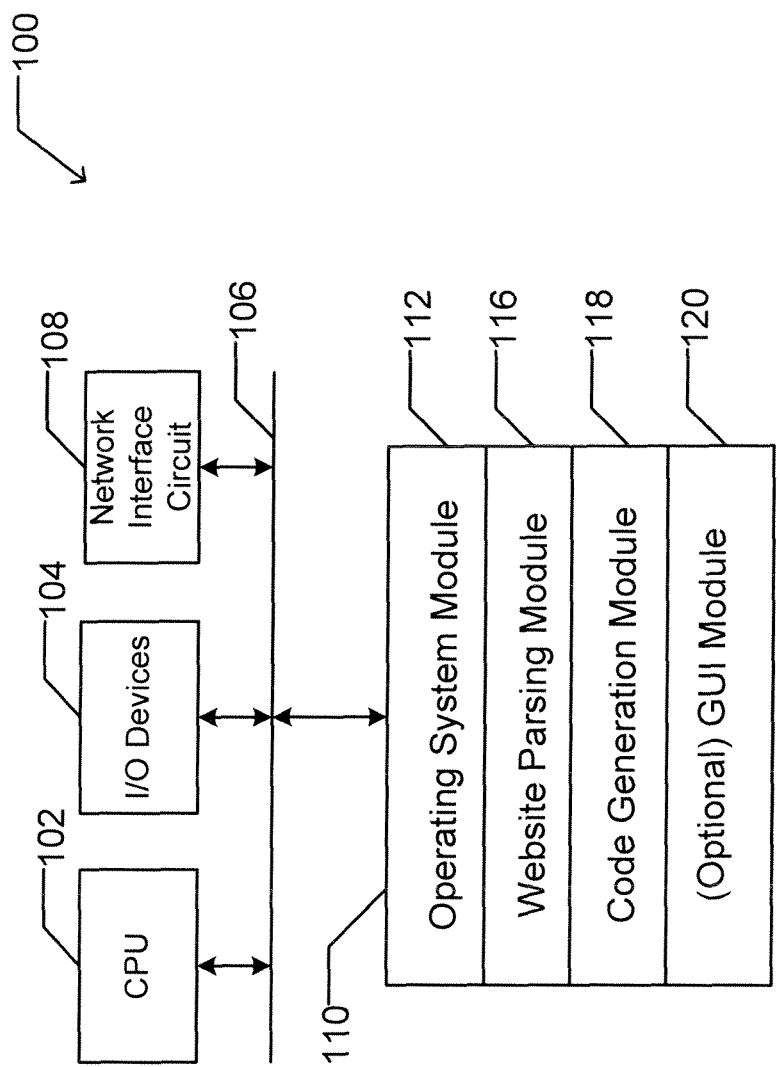
FIG. 1 illustrates a computer for designing a document retrieval component that displays documents related to the content of a website in accordance with an embodiment of the invention.

FIG. 1 illustrates a computer 100 configured in accordance with an embodiment of the invention. The computer 100 includes standard components, including a central processing unit 102 and input/output devices 104, which are linked by a bus 106. The input/output devices 104 may include a keyboard, mouse, touch screen, monitor, printer, and the like. A network interface circuit 108 is also connected to the bus 106. The network interface circuit (NIC) 108 provides connectivity to a network (not shown), thereby allowing the computer 100 to operate in a networked environment.

A memory 110 is also connected to the bus 106. In an embodiment, the memory 110 stores one or more of the following modules: an operating system module 112, a website parsing module 116, a code generation module 118 and a Graphical User Interface (GUI) module 120.

The operating system module 112 may include instructions for handling various system services, such as file services or for performing hardware dependant tasks.

The website parsing module 116 parses the website source code and identifies sections. In an embodiment, the sections are delimited by the tags used in a markup language (e.g., HyperText Markup Language (HTML), ColdFusion Markup Language (CFML), eXtensible HyperText Markup Language (XHTML)). In an embodiment, the result set from a query run by a web service is considered a section, as discussed below in connection with FIG. 9.

The code generation module 118 accepts specifications for creating a document retrieval component and its underlying search function. The module incorporates these specifications when generating source code for the document retrieval component. In an embodiment, the code generation module 118 also generates a Universal Resource Locator (URL) that links to a version of the website that is associated with the document retrieval component.

The optional GUI module 120 may rely upon standard techniques to produce graphical components of a user interface, e.g., windows, icons, buttons, menu and the like, examples of which are discussed below.

The executable modules stored in memory 110 are exemplary. It should be appreciated that the functions of the modules may be combined. In addition, the functions of the modules need not be performed on a single machine. Instead, the functions may be distributed across a network, if desired. Indeed, the invention is commonly implemented in a client-server environment with various components being implemented at the client-side and/or the server-side. It is the functions of the invention that are significant, not where they are performed or the specific manner in which they are performed.

Figure 2:
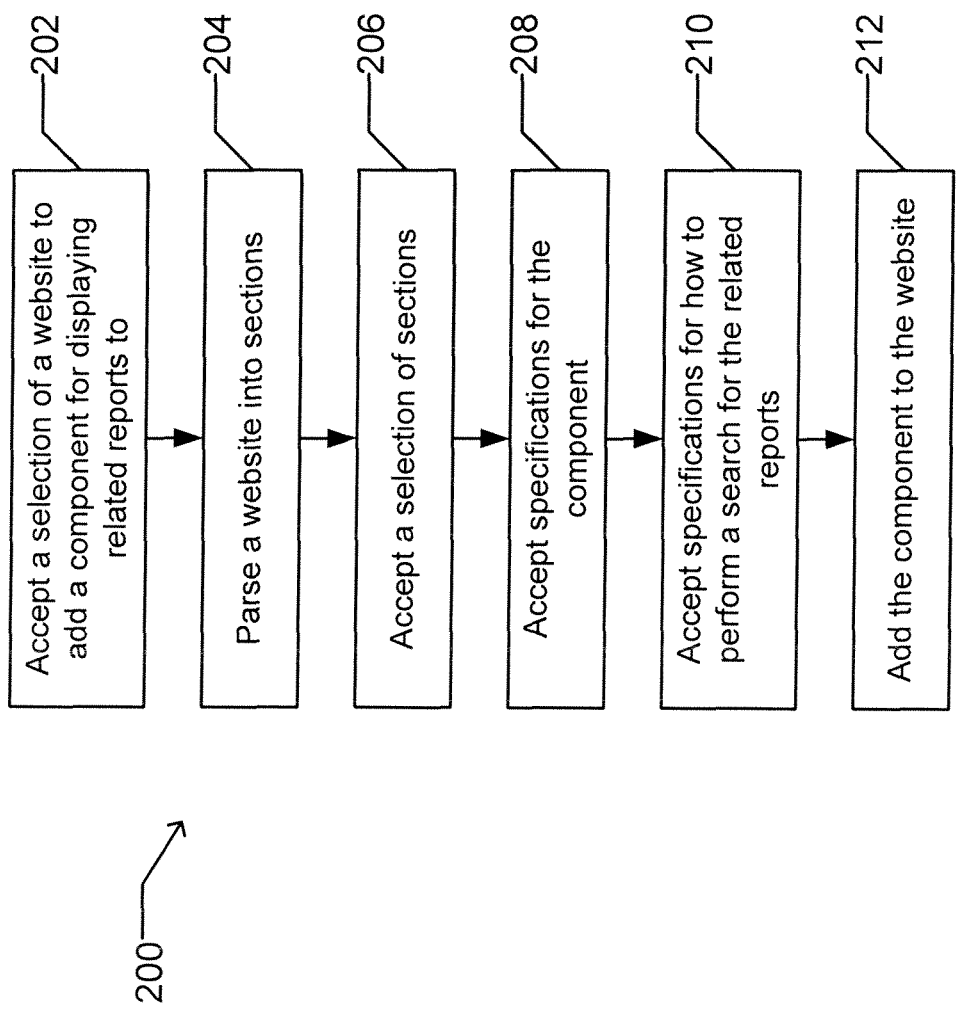
FIG. 2 illustrates processing operations associated with designing a document retrieval component associated with an embodiment of the invention.

FIG. 2 illustrates processing operations 200 associated with designing a document retrieval component in an embodiment of the invention. The first processing operation is to accept a selection of a website to add the document retrieval component to 202. In an embodiment, the website is provided by a third party. In an embodiment, the website is developed by the user. The website is parsed into sections 204 and a selection of sections to extract keywords from is accepted 206. In an embodiment, the user can specify particular keywords rather than selecting sections to extract them from. These keywords are added to a custom tag in the source code.

The next processing operation is to accept specifications for the document retrieval component 208. Default specifications may be provided or the specifications may be provided by the user. In an embodiment, the user can specify the number of documents to display, the minimum match threshold that a document must meet in order to be displayed and the look-and-feel of the document retrieval component.

Next, specifications for how to perform the search for the related documents are accepted 210. Default specifications may be provided or the specifications may be provided by the user. In an embodiment, the user can specify a facet to filter on, an expression operator (i.e., "and" or "or") to use on the keywords and a system to search in. The system may be a repository of reports or a system that provides custom formatted data for a fee.

The final operation is to add the document retrieval component to the website 212. The code generation module 118 generates the source code for the document retrieval component. In an embodiment, the source code for the document retrieval component is inserted into the source code for the website. The appearance and functionality of the component appear static to the website user. To update the appearance or functionality of the document retrieval component, the website source code is updated and recompiled.

In an embodiment, the document retrieval component is a customized widget that is associated with the website. A website user can create a document retrieval component in the form of a widget for any website without access to the website source code. The source code for the document retrieval component remains separate from the website source code. The code generation module 118 generates a URL that accesses a version of the website that is associated with the document retrieval component. In this case, to update the document retrieval component, the user updates the specifications defined for the widget and the code generation module 118 generates new source code for the widget. The website source code is never altered.

Figure 3:
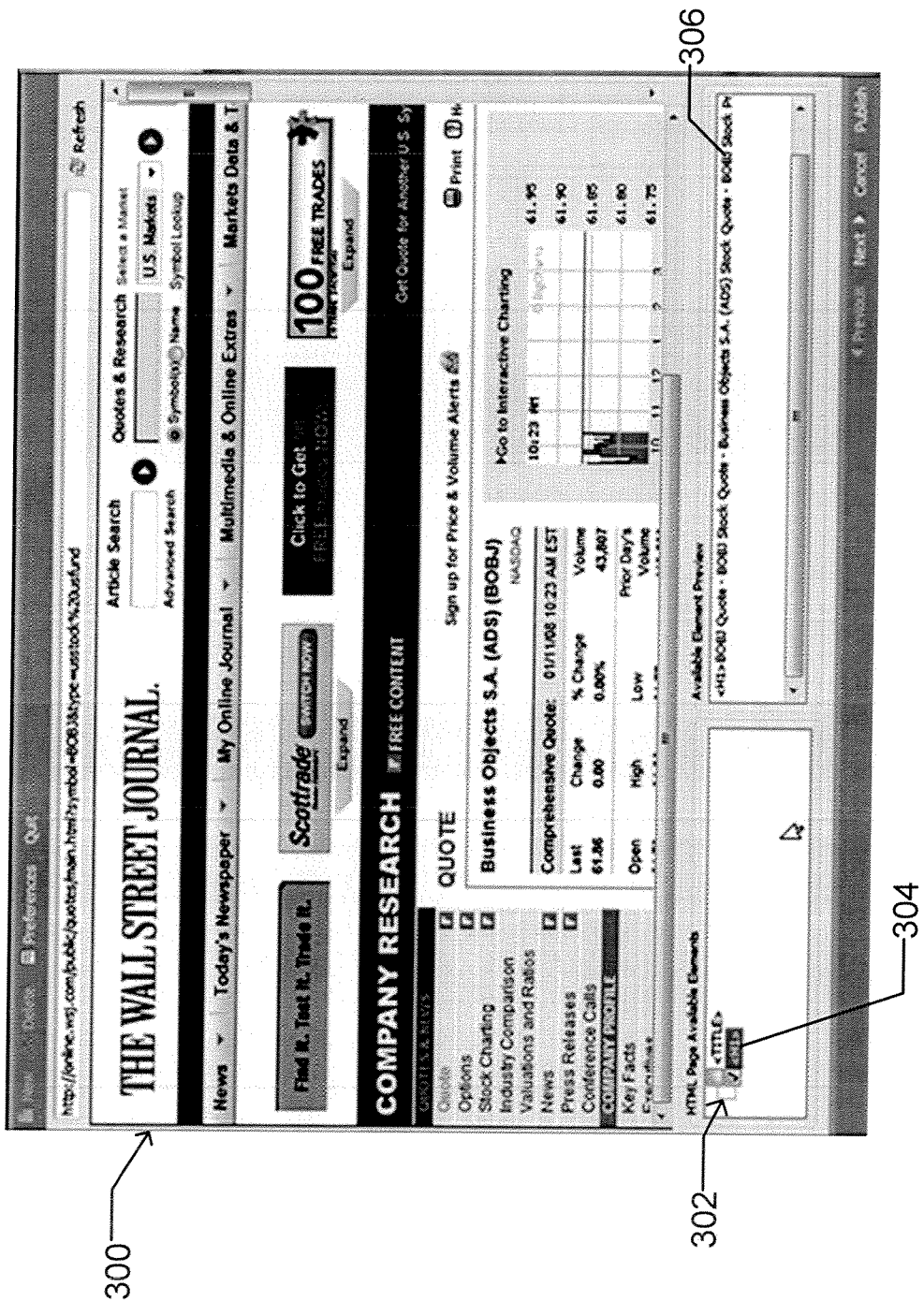
FIG. 3 illustrates the selection of website sections to retrieve keywords in accordance with an embodiment of the invention.

FIG. 3 illustrates the selection of website sections to retrieve keywords from, which illustrates the operation 206 of FIG. 2. After accepting the selection of a website 300, the website parsing module 116 parses the website 300 to identify logical sections from which to extract keywords. A list of sections 302 is provided for the user to select from. In an embodiment, the sections presented for selection are limited to those defined by major markup language tags, such as, for example, header tags, title tags and keyword tags. When a section is selected, such as "<H1>" 304, the GUI module 122 displays the content of the section 306 to the user. In an embodiment, the user can select multiple sections to extract keywords from. In an embodiment, the user can select the entire website as a section.

Figure 4:
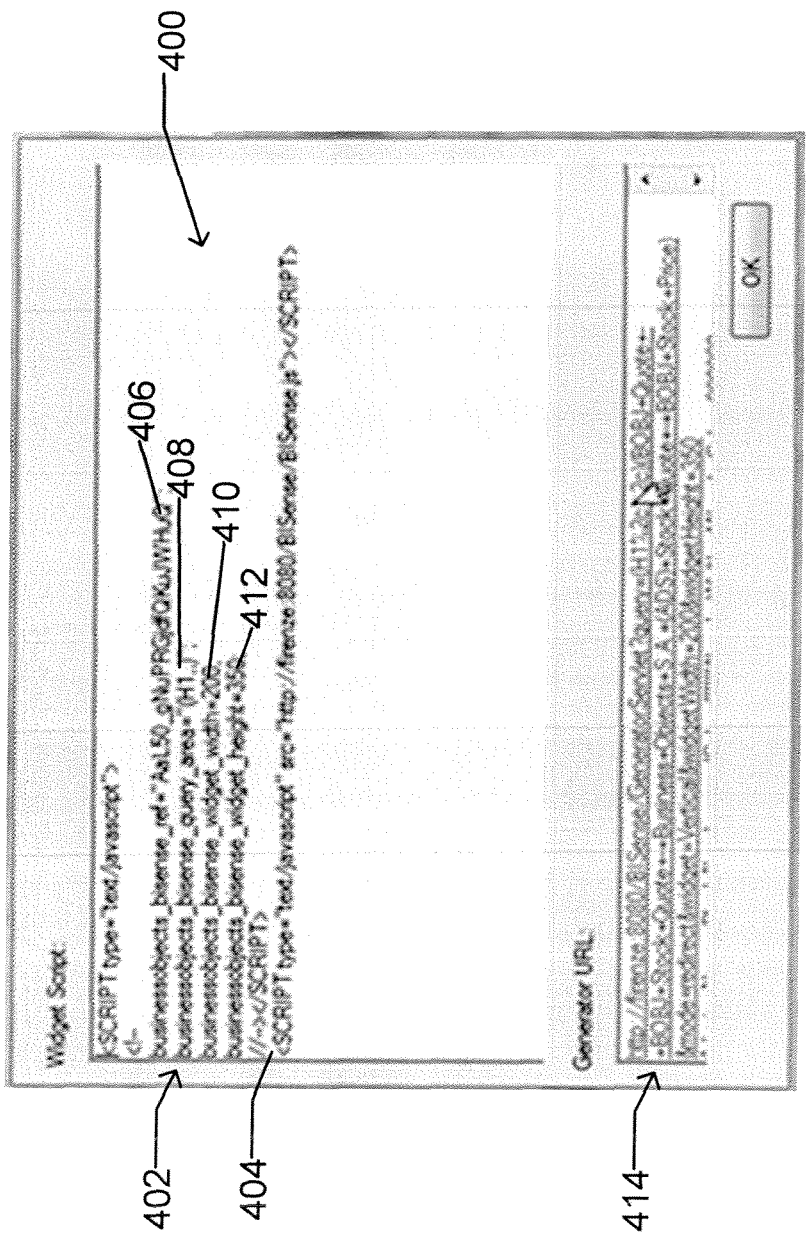
FIG. 4 illustrates source code and a Universal Resource Locator (URL) for a document retrieval component configured in accordance with an embodiment of the invention.

FIG. 4 illustrates source code 400 and a URL 402 generated by the code generation module 118 for a document retrieval component according to an embodiment of the invention. In this example, the source code is written in JavaScript and provided in two parts 402 and 404. The first portion of code 402 provides parameters for the second portion of code 404. The second portion of code 404 references a JavaScript file which contains the majority of the source code, which is the same for each instance of a document retrieval component. Customization is provided through the parameters in the first portion of code 402. In this example, the parameters provided are a unique identifier for this instance of a document retrieval component 406, the website section (header tag H1) to search for keywords in 408, the width of the document retrieval component 410 and the height of the document retrieval component 412. Examples of some other parameters that could be provided are: specific keywords, facets to filter the search, how many reports to display, a minimum match threshold and a look-and-feel for the document retrieval component. In an embodiment, the source code 400 is inserted into the source code for the website. In an embodiment, the source code 400 remains separate from the website source code and the two components are associated using the automatically generated URL 414.

Figure 5:
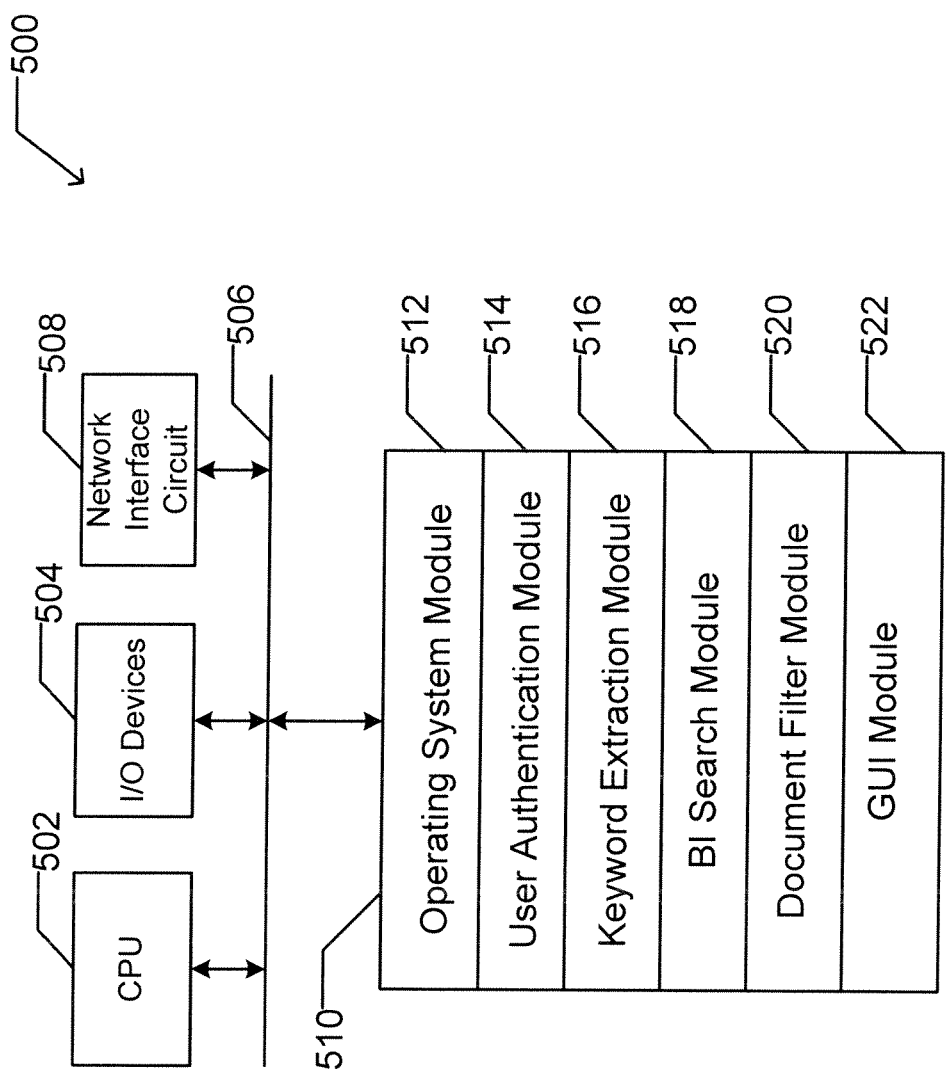
FIG. 5 illustrates a computer for running a document retrieval component configured in accordance with an embodiment of the invention.

FIG. 5 illustrates a computer 500 configured in accordance with an embodiment of the invention. The computer 500 includes standard components similar to those previously discussed in conjunction with FIG. 1. The components 502-508 correspond to the similarly numbered components 102-108 of FIG. 1, i.e., 502 corresponds to 102, 504 corresponds to 104, etc.

Also as in FIG. 5, a memory 510 is connected to the bus 506. In an embodiment, the memory 510 stores one or more of the following modules: an operating system module 512, a user authentication module 514, a keyword extraction module 516, a Business Intelligence (BI) search module 518, a document filter module 520 and a Graphical User Interface (GUI) module 522.

The operating system module 512 and the GUI module 522 may be equated with the operating system module 112 and the GUI module 120 of FIG. 1.

The user authentication module 514 retrieves the user's identification from a logon process and passes it to the system containing the documents to be retrieved. The user authentication module 514 uses the user's identification to retrieve their data access permissions for the system and, in an embodiment, to retrieve additional information about the user, such as, for example, the user's role within an organization.

The keyword extraction module 516 searches the website source code to retrieve the sections to extract keywords from. The keywords are extracted from the content of the retrieved sections and are passed to the BI search module 518 to be included in the query.

The BI search module 518 constructs a query and searches the specified system for documents that match the keywords provided by the keyword extraction module 516. In an embodiment, one or more parameters for the query are defined by user input provided when building the document retrieval component (e.g., one or more facets to search on, how many results to return and the expression operator to use between keywords). The search method technology is disclosed in the following pending, commonly-owned patent applications, each of which is incorporated by reference herein in its entirety: "Apparatus and Method for Generating Queries and Reports," Application Number "11/537,592," filed Sep. 29, 2006; "Apparatus and Method for Searching Reports," Application Number "11/537,597," filed Sep. 29, 2006; "Apparatus and Method for Receiving a Report," Application Number "11/537,587," filed Sep. 29, 2006; and "Apparatus and Method for Dynamically Selecting Componentized Executable Instructions at Run Time," Application Number "11/849,156," filed Aug. 31, 2007. Searching is a common problem and in this case may be addressed in a number of ways. The search method used should not be considered a limitation of the invention.

The document filter module 520 receives the search results from the BI search module 518. The document filter module 520 selects the documents that meet a match threshold requirement and that the user is allowed to access based on the access permissions determined by the user authentication module 514.

The executable modules stored in memory 510 are exemplary. It should be appreciated that the functions of the modules may be combined. In addition, the functions of the modules need not be performed on a single machine. Instead, the functions may be distributed across a network, if desired. Indeed, the invention is commonly implemented in a client-server environment with various components being implemented at the client-side and/or the server-side. It is the functions of the invention that are significant, not where they are performed or the specific manner in which they are performed.

Figure 6:
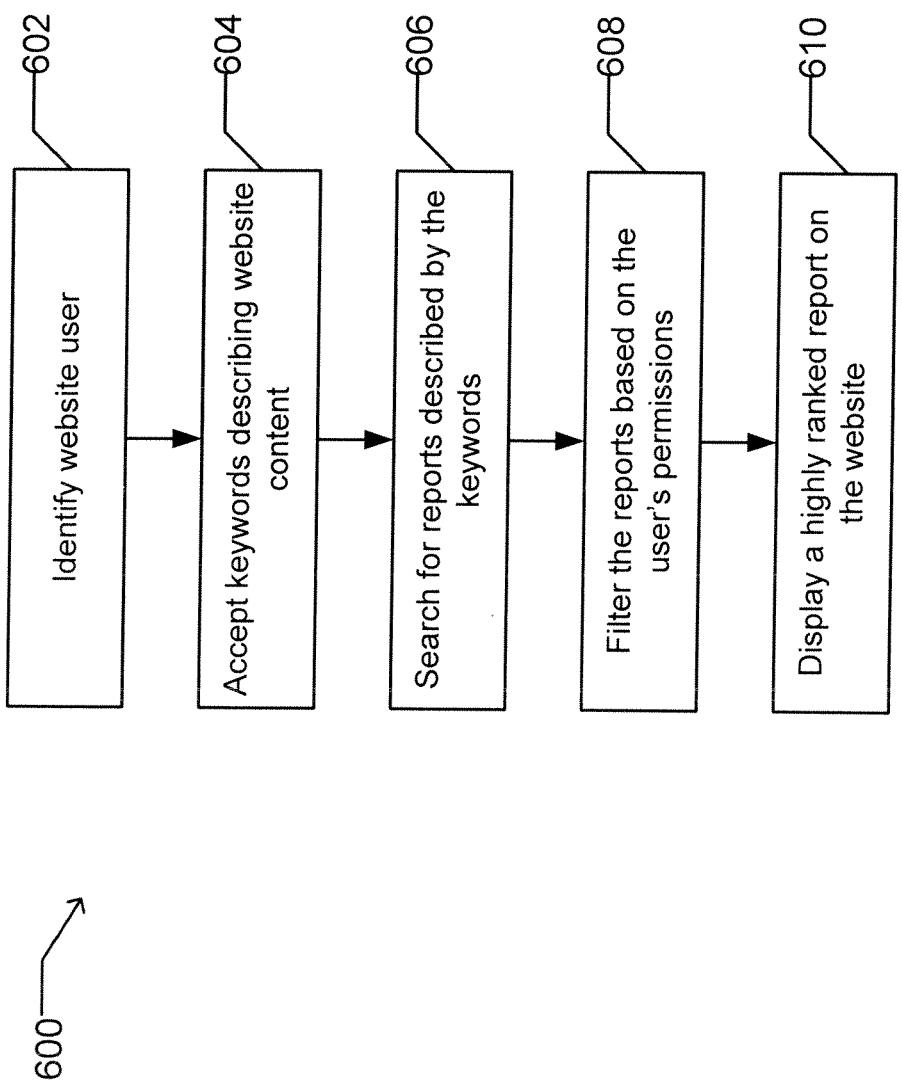
FIG. 6 illustrates processing operations associated with a document retrieval component utilized in accordance with an embodiment of the invention.

FIG. 6 illustrates processing operations 600 associated with using a document retrieval component in an embodiment of the invention. The first processing operation is for the user authentication module 514 to identify the website user 602. In an embodiment, this requires the user to enter logon information. In an embodiment, this is done through single sign-on, identifying the user from previously supplied logon information. The user authentication module 514 authenticates the user on the system that the document retrieval component searches in. Authenticating returns the user's data access permissions for the system to the user authentication module 514. Data access permissions are set by a system administrator and are dependent on factors such as, for example, the data source for the document, the department that the user works in within an organization and the confidentiality level of the document.

In an embodiment, the system provides custom formatted data for a fee. If the user has an account for the system, the document retrieval component may allow the user to logon to the system. The document retrieval component will either return data restricted to that which the user has already purchased or it will return the most relevant data regardless of what the user has purchased. In the latter case, the user may have to purchase a retrieved document before being able to open it. If the user does not have an account for the system, the user may have to sign up for an account on the system and purchase a retrieved document before being able to open it.

The next processing operation is to accept keywords describing the website content 604. In an embodiment, the keyword extraction module 516 searches for previously indicated sections of the website to extract keywords from. All the words in these sections are considered keywords. In an embodiment, the document retrieval component prompts the user to enter their desired keywords. The BI search module 518 then searches for documents described by the keywords 606. The BI search module 518 either looks for documents described by any of the keywords or all of the keywords, depending on the expression operator being used (i.e., "or" or "and," respectively). In an embodiment, the BI search module 518 returns the search results ranked in order of how closely the keywords match the document.

In an embodiment, the BI search module 518 searches for and returns reports. In an embodiment, the BI search module 518 searches for and returns a variety of documents, such as, for example, reports, widgets, presentations, word processing documents and spreadsheets.

When the BI search module 518 returns the search results, the document filter module 520 filters the documents based on the user's data access permissions 608. The document filter module 520 uses the data access permissions retrieved by the user authentication module 514 to identify the documents that the user is eligible to view. The GUI module 522 displays one or more highly ranked documents 610, possibly in order of descending rank. In an embodiment, if there are no eligible documents to display, the GUI module 522 will display a message explaining this to the user.

Figure 7:
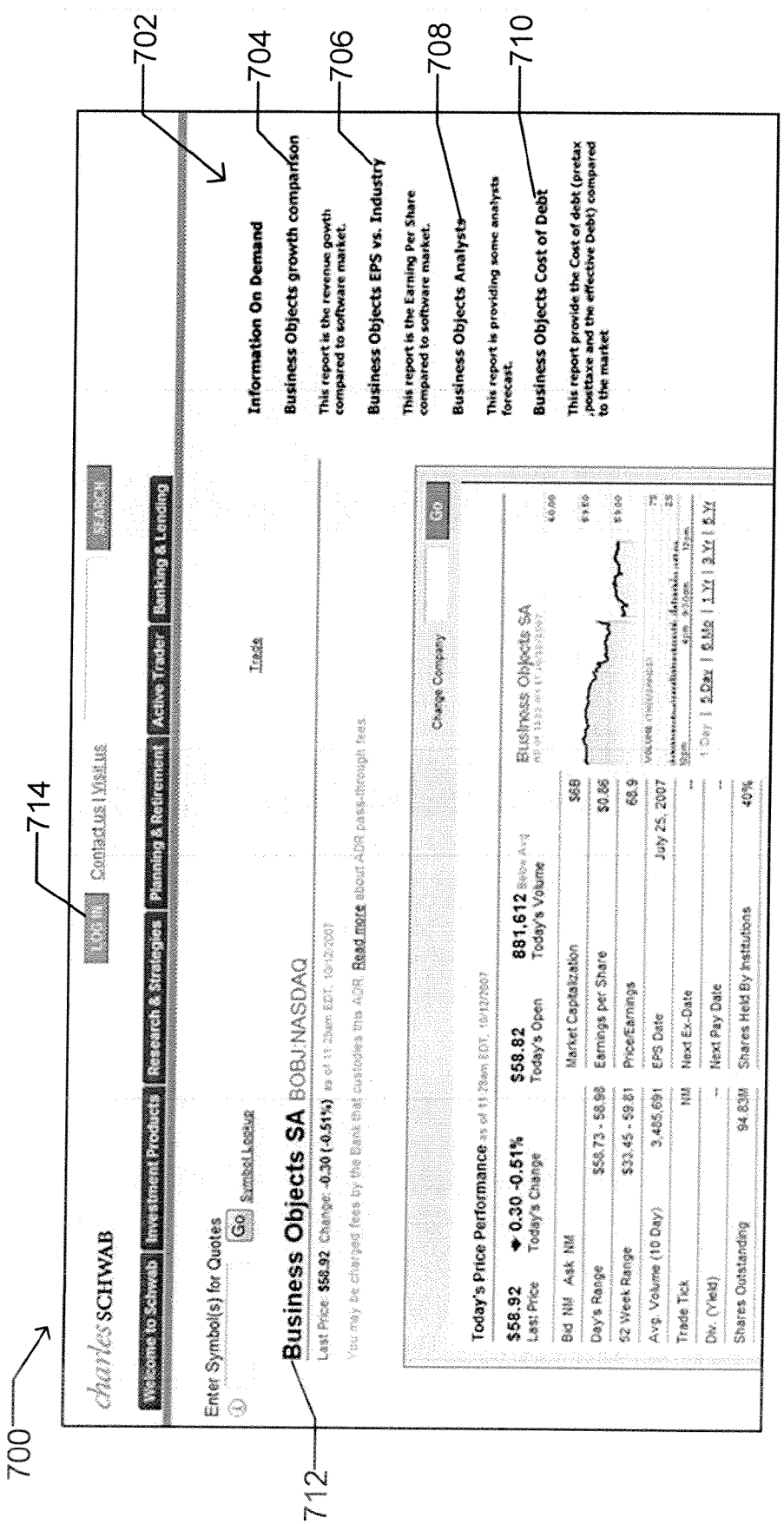
FIG. 7 illustrates a website with a panel displaying related documents identified in accordance with an embodiment of the invention.

FIG. 7 illustrates a website 700 with a panel 702 displaying related documents supplied in accordance with an embodiment of the invention. The panel 702 contains the document retrieval component, which has returned documents 704-710. As illustrated by the titles and descriptions of the documents 704-710 and the header "Business Objects SA BOBJ:NAS-DAQ" 712, both the website 700 and the retrieved documents 704-710 focus on Business Objects financial data. In an embodiment, the keywords to perform the search are extracted from the header 712.

Figure 8:
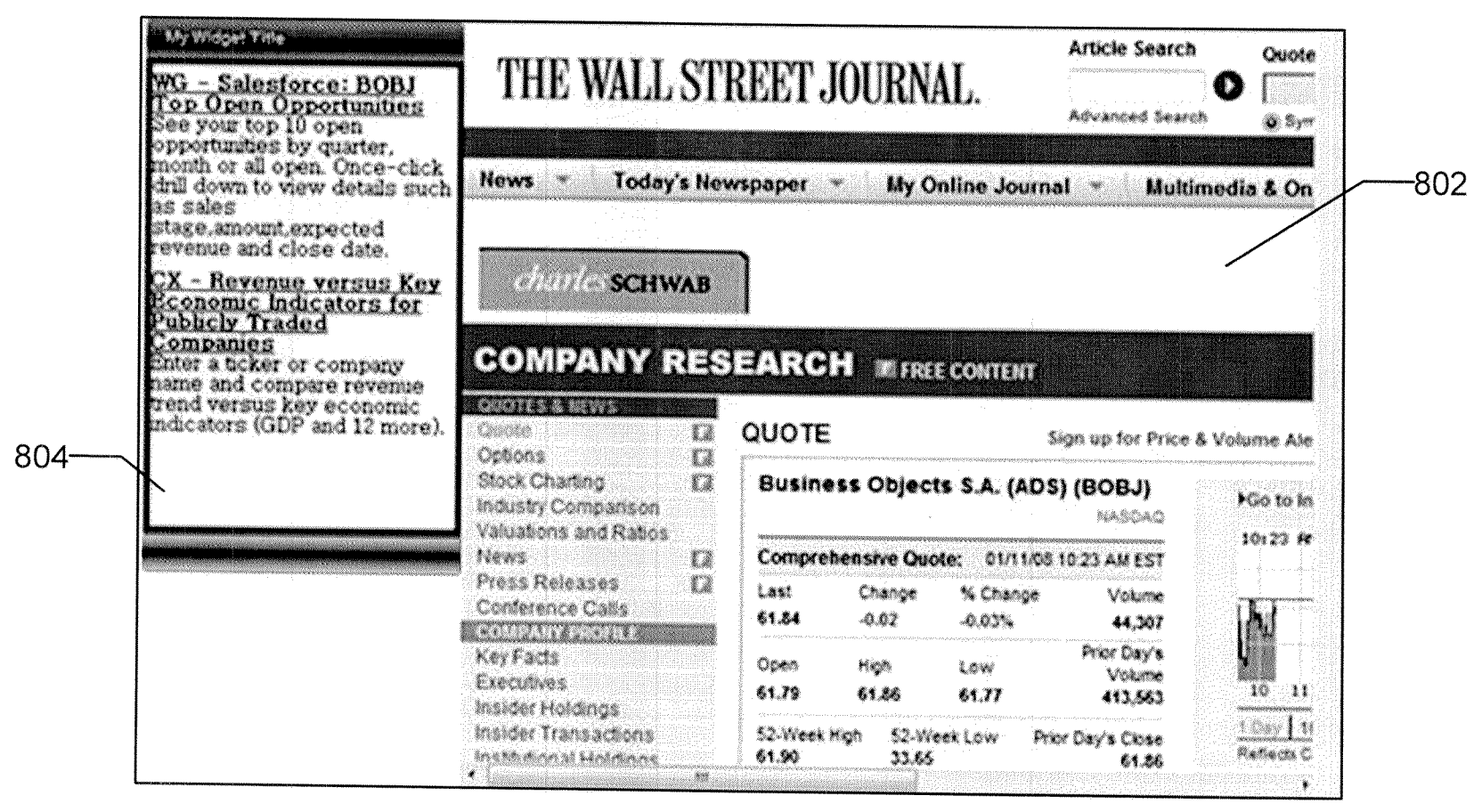

FIG. 8 illustrates a website 802 and a custom widget 804 that provides related documents in accordance with an embodiment of the invention. The custom widget 804 is a document retrieval component created by a website user. It is accessible to the user via a URL that links to a version of the website 802 that is associated with the widget 804.

Figure 9:
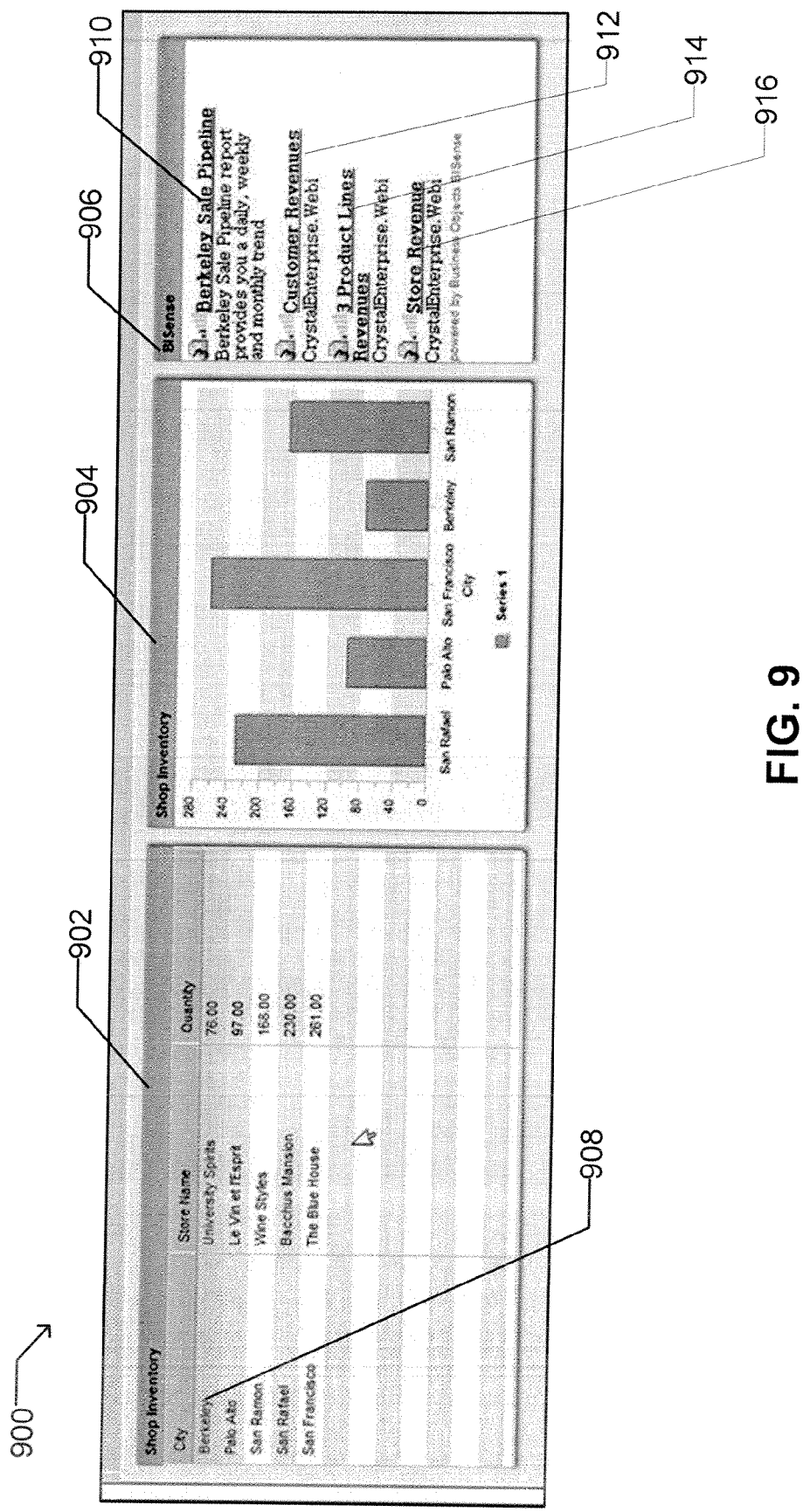
FIG. 9 illustrates a website comprising the results of a query run by a web service and a panel displaying related documents identified in accordance with an embodiment of the invention.

FIG. 9 illustrates a website 900 comprising the results of a query run by a web service 902, a chart of the results 904 and a panel displaying related documents 906 supplied in accordance with an embodiment of the invention. In this case, the keyword extraction module 616 may retrieve keywords from the results of a query run by a web service 902. In an embodiment, the default function is to retrieve documents that relate to the entire result set, but the user can select one or more rows from the result set to focus the document search. In this case, documents related to the selected row(s) may be listed first, followed by documents related to the entire result set. Selecting the result row for Berkley 908 updates the documents returned by the document retrieval component 906. The highest ranked document 910 is specific to Berkley data. The remaining documents 912-916 are related to the entire result set.

In an embodiment, when the user opens a document, the data access permissions determined by the user authentication module 514 are used to filter the content of the document.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer-implemented method comprising:
  accessing a website having an associated document retrieval component;
  retrieving, by the document retrieval component, reports related to the website from a business intelligence system, each report being automatically retrieved from a data source and structured in accordance with a report schema that specifies a form in which information contained within such report should be presented; and
  concurrently displaying the website and data characterizing the retrieved reports;

wherein specifications used by the document retrieve component to retrieve the reports are collected by:
  parsing the website to identify logical sections of the website from which to extract keywords,
  presenting at least a portion of the sections to the user for selection of one or more but not all of the sections of the website, and
  extracting keywords from the selected section(s) by the user, the specifications comprising at least a portion of the extracted keywords,
wherein the specifications for the document retrieval component are selected from one or more of how many reports to display, a minimum match threshold that indicates how closely a report must be associated with the set of keywords in order to be displayed, one or more website sections from which to retrieve a set of keywords describing the website and a look-and-feel for the document retrieval component.

2. The computer-implemented method of claim 1, further comprising:
  authenticating a website user accessing the website;
  returning data access permissions of the user; and
  filtering the retrieved reports based on the data access permissions of the user.

3. The computer-implemented method of claim 1, wherein the one or more logical sections are identified by tags in source code for the website.

4. A non-transitory computer readable medium, comprising executable instructions to:
  accept, via a graphical user interface, a selection of a website from a user to add a document retrieval component for retrieving related reports, each report being automatically retrieved from a data source and structured in accordance with a report schema that specifies a form in which information contained within such report should be presented;
  collect specifications for the document retrieval component by:
    parsing the website to identify logical sections of the website from which to extract keywords,
    presenting at least a portion of the sections to the user for selection of one or more but not all of the sections of the website, and
    extracting keywords from the selected section(s) by the user, the specifications comprising at least a portion of the keywords extracted from the selected section(s) by the user;
  receive the collected specifications for the document retrieval component; and
  add the document retrieval component to the website so that the related reports are automatically retrieved when the website is subsequently accessed;
wherein the specifications for the document retrieval component are selected from one or more of how many reports to display, a minimum match threshold that indicates how closely a report must be associated with the set of keywords in order to be displayed, one or more website sections from which to retrieve a set of keywords describing the website and a look-and-feel for the document retrieval component.

5. The computer readable medium of claim 4, wherein the executable instructions to add the document retrieval component comprise executable instructions to insert a portion of automatically-generated code into source code associated with the website.

6. The computer readable medium of claim 4, wherein the executable instructions to add the document retrieval component comprise executable instructions to associate a custom widget with the website.

7. The computer readable medium of claim 6, further comprising executable instructions to generate a link to access the website with the custom widget.

8. The computer readable medium of claim 5, wherein the portion of automatically-generated code comprises a custom tag specifying the set of keywords.

9. The computer readable medium of claim 4, wherein the one or more logical sections are identified by tags in source code for the website.

10. The computer readable medium of claim 4, wherein the specifications for how to perform the search are selected from one or more of a facet to filter on, an expression operator to use on the set of keywords and a system to search in.

11. A non-transitory computer readable medium, comprising executable instructions to:
  access a website having an associated document retrieval component;
  retrieve, by the document retrieval component, reports related to the website from a business intelligence system, each report being automatically retrieved from a data source and structured in accordance with a report schema that specifies a form in which information contained within such report should be presented; and
  concurrently display the website and data characterizing the retrieved reports;
wherein specifications used by the document retrieve component to retrieve the reports are collected by:
  parsing the website to identify logical sections of the website from which to extract keywords,
  presenting at least a portion of the sections to the user for selection of one or more but not all of the sections of the website, and
  extracting keywords from the selected section(s) by the user, the specifications comprising at least a portion of the extracted keywords,
wherein the specifications for the document retrieval component are selected from one or more of how many reports to display, a minimum match threshold that indicates how closely a report must be associated with the set of keywords in order to be displayed, one or more website sections from which to retrieve a set of keywords describing the website and a look-and-feel for the document retrieval component.

12. The computer readable medium of claim 11, further comprising executable instructions to:
  authenticate a website user accessing the website;
  return data access permissions of the user; and
  filtering the retrieved reports based on the data access permissions of the user.

13. The computer readable medium of claim 11, wherein the one or more logical sections are identified by tags in source code for the website.

* * * * *